United States Patent [19]
Cranston et al.

[11] 3,941,361
[45] Mar. 2, 1976

[54] WATER-FILLED BURNING TABLE

[75] Inventors: George Edward Cranston, Ioco, Canada; Jack Milton Moody, Milwaukie, Oreg.

[73] Assignee: Cranston Machinery Co., Inc., Oak Grove, Oreg.

[22] Filed: Nov. 29, 1974

[21] Appl. No.: 528,353

[52] U.S. Cl. .................. 269/15; 134/103; 269/296
[51] Int. Cl.² ........................................ B23Q 23/00
[58] Field of Search ...... 269/15, 269; 134/102, 103, 134/186

[56] References Cited
UNITED STATES PATENTS

| | | | |
|---|---|---|---|
| 2,774,362 | 12/1956 | Nordling | 134/103 X |
| 2,835,261 | 5/1958 | Wogan | 134/103 X |
| 2,890,883 | 6/1959 | Brookhouser | 269/296 |

FOREIGN PATENTS OR APPLICATIONS

| | | | |
|---|---|---|---|
| 509,541 | 3/1969 | Switzerland | 134/103 |

*Primary Examiner*—Harold D. Whitehead
*Attorney, Agent, or Firm*—Lee R. Schermerhorn

[57] ABSTRACT

The entire table frame is a tank. The upper portion of the tank provides a working area and the lower portion forms a closed water flow control chamber. Removable gratings in the upper portion underlie support rails which support steel plates to be cut into desired shapes by an automatic profile burning head or a gang of such burning heads. The introduction of compressed air into the lower chamber displaces water into the upper section to submerge the removable grating. The water subdues the noise and smoke of the burning operation, cools the plates being burned, thus reducing distortion and catches the slag produced. Small pieces of metal falling off the plate being cut are cooled by the water and retained on the gratings. Release of air pressure from the lower chamber allows the water in the upper portion to return quickly to the lower chamber for convenient removal of the metal pieces from the gratings.

4 Claims, 6 Drawing Figures

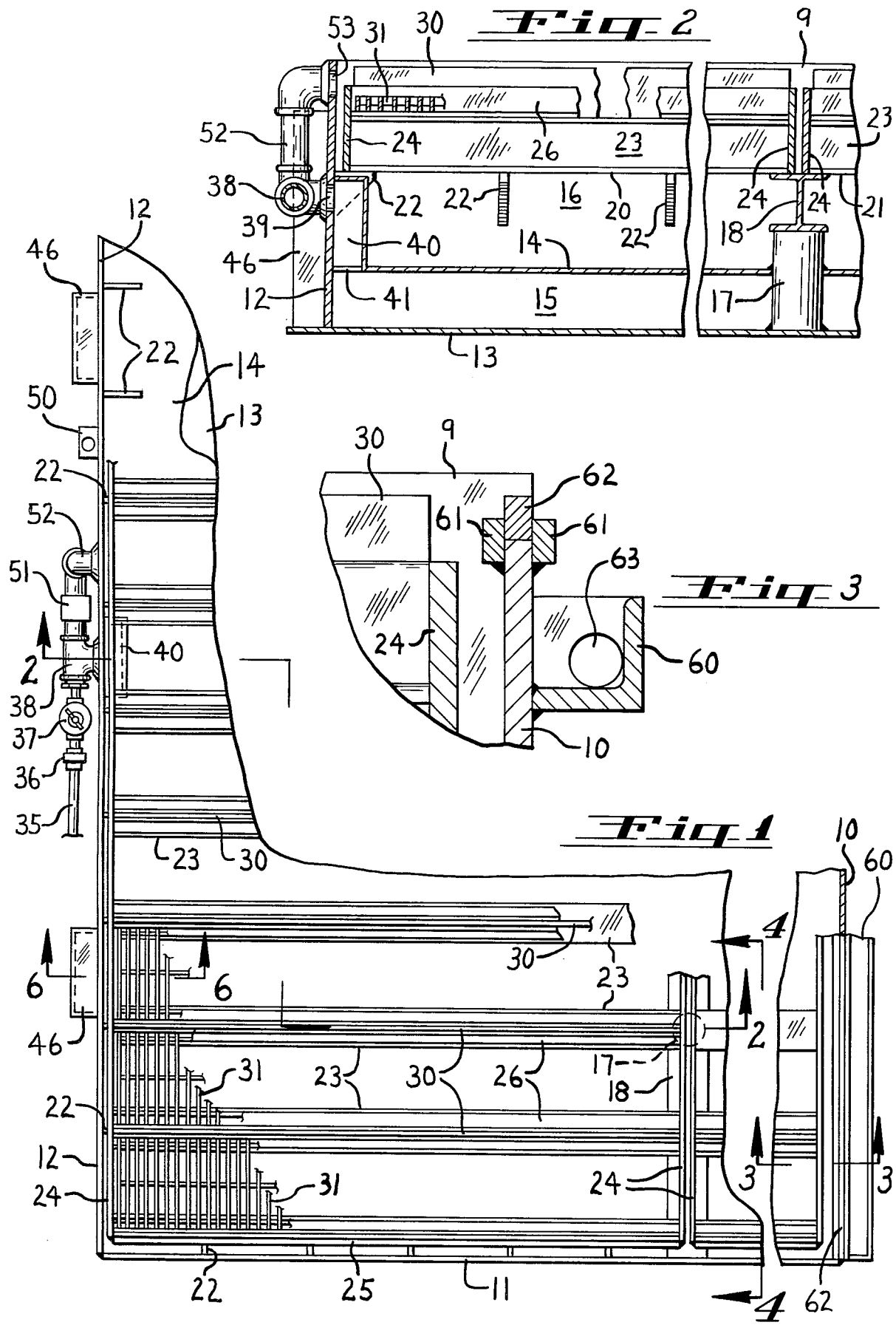

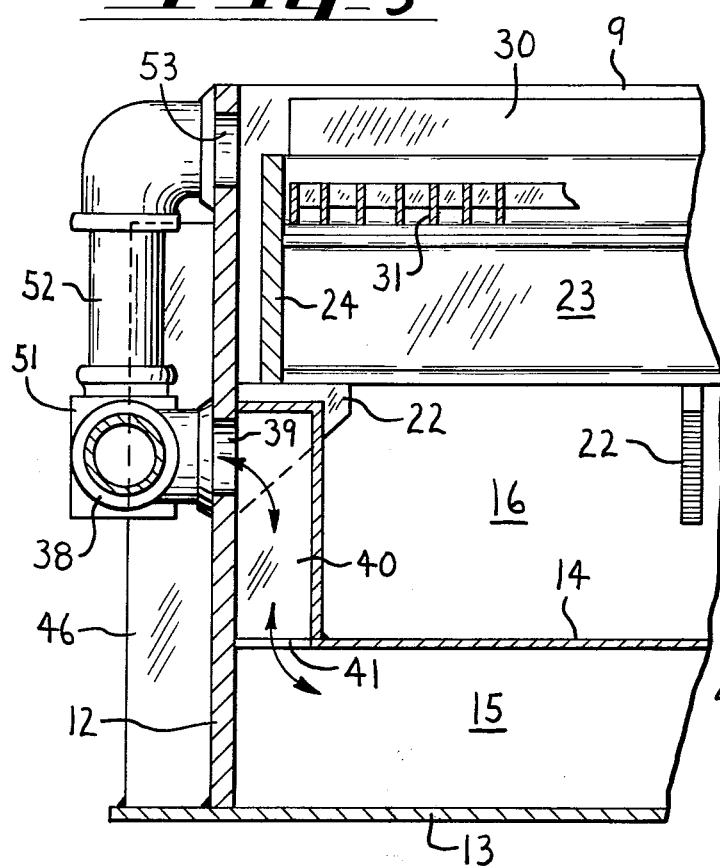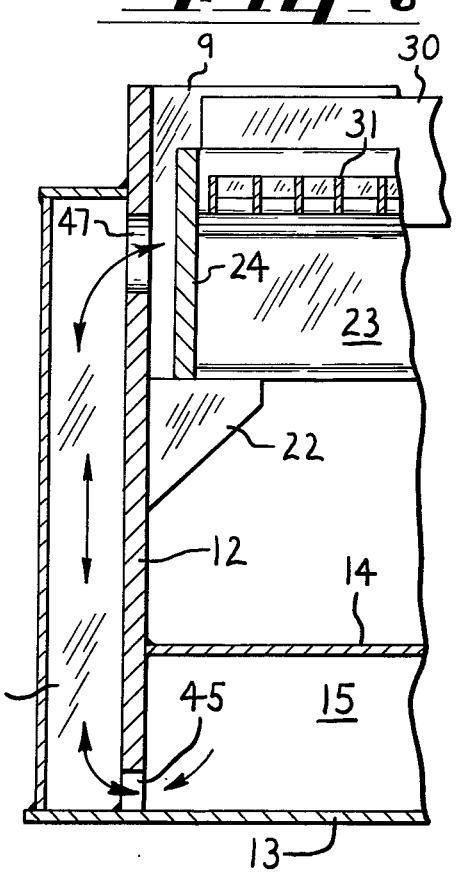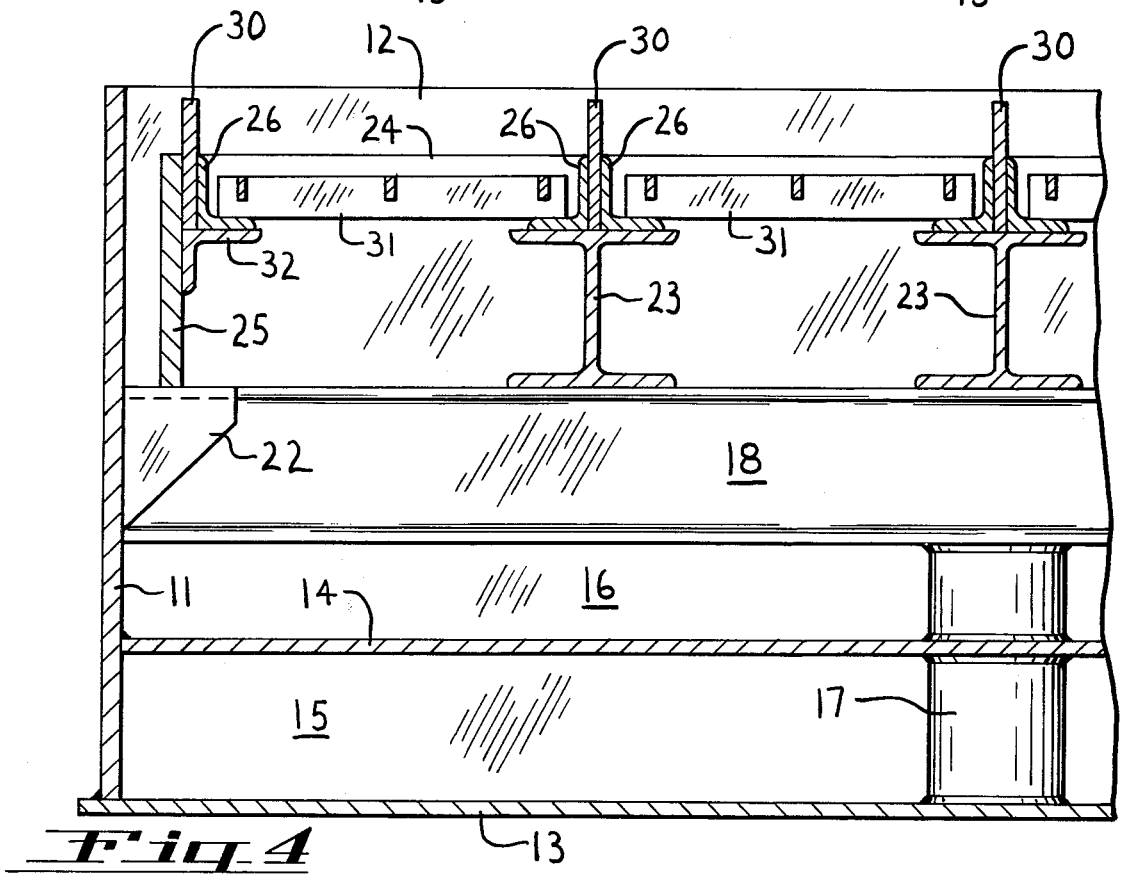

WATER-FILLED BURNING TABLE

BACKGROUND OF THE INVENTION

This invention relates to a water-filled burning table for use in the profile burning of steel plates.

The use of torches to cut steel plates to desired configurations presents problems in the support of the plates and in the handling of the slag and hot pieces of metal which are cut from the plates. The torches used in such operations also produce noise and smoke which are a hazard to the health and safety of the operator. Some types of torches discharge a water spray which must be delt with.

Objects of the invention are therefore to provide an improved burning table, to provide a burning table which does not impair the health and safety of the workmen, to provide a burning table adapted to cool and collect smoke, slag and hot pieces of metal cut off from the plates, to provide a novel arrangement of water tank for this purpose and to provide a burning table having an upper portion which may be flooded with water displaced by compressed air from a water chamber underneath without the use of water pumps or water valves.

SUMMARY OF THE INVENTION

In the present construction the entire table frame is a tank. The upper portion of the tank contains removable gratings underlying support rails for the work piece. The lower part of the tank contains a closed chamber into which compressed air may be introduced for displacing water from the chamber into the upper portion to flood the grating.

Hot slag and hot pieces of metal falling from the work piece are cooled by the water with the metal being retained on the gratings. Upon release of the air pressure from the lower chamber water in the upper section flows back into the chamber.

The work piece itself may be submerged in the water, if desired, to subdue the noise of the torch and collect much of the smoke produced, to benefit the health and safety of the workmen.

The invention will be better understood and the foregoing and other objects and advantages will become apparent from the following description of the perferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a fragmentary top plan view of a burning table embodying the invention;

FIG. 2 is a view on the line 2—2 in FIG. 1 with parts broken away;

FIG. 3 is a view on the line 3—3 in FIG. 1;

FIG. 4 is a view on the line 4—4 in FIG. 1;

FIG. 5 is an enlarged view of a portion of the structure shown in FIG. 2; and

FIG. 6 is a view on the line 6—6 in FIG. 1.

DESCRIPTION OF THE PREFERRED EMBODIMENT

Referring first to FIGS. 1 and 2, the table comprises a rectangular tank having four vertical side walls 9, 10, 11 and 12 and a bottom wall 13.

A horizontal plate 14 connected and sealed to the side walls divides the tank into a lower air-tight pressure chamber 15 and an upper open working chamber 16. Extending across the center of the tank in one direction is a row of pedestals 17 welded to bottom plate 13. Pedestals 17 support a center I beam 18 extending across upper chamber 16 from side to side.

The I beam 18 supports adjacent side edges of a pair of removable frames 20 and 21. The other three sides of each frame 20 and 21 are supported on brackets 22 welded on the inside of the four vertical side walls of the tank. Each frame 20 and 21 comprises a series of spaced apart I beams 23 welded to vertical end plates 24. On the other two sides of each frame 20 and 21 is a vertical plate 25, shown in FIG. 4, welded at its opposite ends to plates 24.

Angle irons 26 welded on I beams 23, and plates 25, provide vertical slots to receive horizontal burning rails 30 which support the work peice on their upper edges. Between each pair of burning rails 30 a removable grating 31 is also supported on I beams 23, the outer edge of the marginal grating being supported by an angle iron 32 on plate 25.

A compressed air supply pipe 35 is connected to a solenoid valve 36 and a pressure regulating valve 37. Valve 37 is connected to a tee fitting 38 which communicates with an opening 39 in tank wall 12 as shown in FIGS. 2 and 5. Opening 39 communicates with the upper end of a chamber 40 which in turn communicates at its lower end with an opening 41 in plate 14 whereby air from pressure pipe 35 may be blown into the closed bottom chamber 15.

Lower chamber 15 is filled with water when the table is not in use and a quantity of water is normally retained in upper chamber 16. The introduction of air pressure into chamber 15 through opening 41 forces water out of chamber 15 through an opening 45 in wall 12 at the bottom of chamber 15, as shown in FIG. 6. This water flows up through a vertical passagewaty 46 and out through an upper opening 47 into the upper chamber 16 of the tank, submerging the frames 20 and 21 and gratings 31.

Water can thus flow out of lower chamber 15 until the water level therein is depressed to the upper edge of opening 45. Sufficient water is displaced from chamber 15 to raise the water level in the upper chamber 16 to the top edges of burning rails 30. A level control switch 50 in FIG. 1 operates to close solenoid valve 36 and shut off the air pressure supply when the water level in the upper chamber reaches the top edges of burning rails 30.

Tee fitting 38 is also connected to a solenoid valve 51 and a riser pipe 52 which communicates with an opening 53 in side wall 12. With the compressed air supply shut off at solenoid valve 36 the water level in the upper chamber may be lowered by opening solenoid valve 51. The opening of solenoid valve 51 allows the air in chamber 15 to escape through opening 41, chamber 40, tee fitting 38, solenoid valve 51, riser 52 and opening 53. Any water contained in the air discharge is thereby returned to the upper chamber.

The release of air from chamber 15 permits a quick return flow of water by gravity from upper chamber 16 through opening 47, passageway 46 and opening 45 in FIG. 6 to the lower chamber, lowering the water level in the upper chamber to the lower surface of gratings 31. This depressed water level permits convenient removal of the pieces of metal which have collected on the gratings.

It will be observed that the valves 36 and 51 are air valves and that there are no valves in water passageway 46 to become fouled by pieces of slag in the water. These valves may conveniently be controlled by a two position toggle switch. In one position the switch opens valve 36 and closes valve 51 to fill the upper chamber 16. Level control switch 50 closes valve 36 when the upper chamber is filled. In its other position the toggle switch maintains valve 36 closed and opens vent valve 51 to allow water in the upper chamber to return to the lower chamber.

The burning table just described may comprise one section of a much longer burning table having a number of such sections, or tanks, placed together side by side or spaced apart any desired distance. For this purpose the side wall 10 is cut down below the top edges of the other side walls 9, 11 and 12 and a gutter 60 is provided, as shown in FIG. 3. A pair of bars 61 welded on the upper edge of side wall 10 provides a vertical slot to receive a burning rail 62 of copper or other non consumable material. The top edge of burning rail 62 is on the same level as the top edges of burning rails 30. Any overflow of water over burning rail 62 displaced by slag deposited in chamber 16 is conveyed by gutter 60 to a drain connection 63. The water level is normally maintained at the top edges of rails 30 and 62.

Thus, the gutter side of the tank shown in FIG. 3 may be brought adjacent to the similar gutter side of another similar tank to double the working area of the burning table. If tanks are provided having two opposite sides constructed as shown in FIG. 3 any number of such tanks may be added side by side to extend the length of the burning table to any desired distance. A long work piece is supported on burning rails 62 as well as burning rails 30 in the several tanks to provide the neccessary supporting surfaces in a common horizontal plane. The burning rails 30 and 62 are not fastened to the tanks but are merely loosely supported in the vertical slots provided, for convenient replacement when they become severely damaged by the overhead cutting torches.

The cutting torches are directed vertically downward and moved in a prescribed path to cut steel plates supported on burning rails 30 and 62 to desired configuration. Small pieces of metal and scrap cut off from a plate are collected on removable gratings 31 and are immediately cooled as they are submerged in the water in the upper chamber. The upper chamber also collects slag from the burning operations and this may be removed from time to time by lifting out removable frames 22 and draining the water out of the upper chamber. Both upper and lower chambers are provided with removable drain plugs, not shown, for completely draining both parts of the tank.

For under water cutting, to reduce the noise and smoke produced by plasma torches, the rail 62 may be omitted and side wall 10 extended to a height sufficient to maintain water over the top of the work piece.

Having now described our invention and in what manner the same may be used, what we claim as new and desire to protect by Letters Patent is:

1. A burning table comprising a water tank having a closed pressure chamber in its lower portion and an open working chamber in its upper portion, means supporting horizontal removable frames in an upper portion of said working chamber, means in said frames removably supporting parallel horizontal burning rails spanning the top of said working chamber, means in said frames removably supporting horizontal gratings between said rails, a water passageway connecting a lower portion of said lower chamber with an upper portion of said upper chamber just below said gratings, an air passageway connecting an upper portion of said lower chamber with an upper portion of said upper chamber, an air vent valve in said passageway, an air pressure supply pipe connected to said air passageway between said air vent valve and said lower chamber, and a valve in said pipe, the introduction of air pressure into said lower chamber displacing water from said lower chamber through said water passageway into said upper chamber to submerge said burning rails and gratings, and the opening of said air vent valve discharging air from said lower chamber and any water in said air passageway through said air passageway into said upper chamber and allowing return of water from only the upper portion of said upper chamber through said water passageway to said lower chamber until the water level in said upper chamber is just below said gratings.

2. A burning table as defined in claim 1, said air vent valve and said valve in said pipe being solenoid valves.

3. A burning table as defined in claim 1, said means removably supporting said burning rails comprising horizontal slots in said frames.

4. A burning table as defined in claim 1, one of said burning rails being mounted on a side wall of the tank and defining the upper edge of said side wall, and a gutter on the outside of said side wall below said one rail.

* * * * *